US011876454B2

(12) United States Patent
McLean

(10) Patent No.: US 11,876,454 B2
(45) Date of Patent: *Jan. 16, 2024

(54) PUSH-PULL CONVERTER WITH REDUCED EMI AND VOLTAGE SPIKES

(71) Applicant: Hamilton Sundstrand Corporation, Charlotte, NC (US)

(72) Inventor: Andrew Fitzroy McLean, Solihull (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,254

(22) Filed: Jun. 30, 2022

(65) Prior Publication Data

US 2022/0337164 A1 Oct. 20, 2022

Related U.S. Application Data

(63) Continuation of application No. 16/838,642, filed on Apr. 2, 2020, now Pat. No. 11,437,919.

(30) Foreign Application Priority Data

Jul. 2, 2019 (GB) ...................................... 1909543

(51) Int. Cl.
*H02M 3/337* (2006.01)
*H02M 3/158* (2006.01)
*H02M 1/00* (2006.01)

(52) U.S. Cl.
CPC ....... *H02M 3/1582* (2013.01); *H02M 3/3374* (2013.01); *H02M 1/0096* (2021.05)

(58) Field of Classification Search
CPC .............................................. H02M 3/335–42
See application file for complete search history.

(56) References Cited

U.S. PATENT DOCUMENTS 4,011,494 A * 3/1977 Saka ................... H02M 3/3376
363/17
4,893,227 A 1/1990 Gallios et al.
(Continued)

FOREIGN PATENT DOCUMENTS

JP 6370292 U 5/1988
JP H07322611 A 12/1995

OTHER PUBLICATIONS

European Search Report Issued in European Application No. 19192126.1-1201 dated Mar. 9, 2020; 9 Pages.

(Continued)

*Primary Examiner* — Peter M Novak
(74) *Attorney, Agent, or Firm* — CANTOR COLBURN LLP

(57) ABSTRACT

A power supply circuit has a push-pull portion having a transformer; first and second terminals of the primary winding, each connected to ground via first and second switches; an inductor connected between an input voltage and the primary winding centre tap via a third switch; an energy storage portion connected between the primary winding and ground, and to the inductor via a fourth switch; a controller arranged to monitor the input voltage and to apply partially overlapping first and second PWM signals to the first and second switches; when input voltage is between first and second thresholds, the controller closes the third switch and opens the fourth switch; above the second threshold, the controller applies a third PWM signal to the third switch and opens the fourth switch; and below the first threshold, the controller closes the third switch and applies a fourth PWM signal to the fourth switch.

11 Claims, 11 Drawing Sheets

(56) References Cited

U.S. PATENT DOCUMENTS

| | | |
|---|---|---|
| 5,872,706 A | 2/1999 | Kern |
| 5,882,492 A | 3/1999 | Manley et al. |
| 8,467,199 B2 | 6/2013 | Lee et al. |
| 2008/0043498 A1 | 2/2008 | Mohandes |
| 2013/0027984 A1 | 1/2013 | Takegami |
| 2017/0133940 A1 | 5/2017 | Wilkinson et al. |
| 2021/0006166 A1 | 1/2021 | McLean |

OTHER PUBLICATIONS

Trip et al.; "Considerations on Efficiency Increase for Power Electronic Circuits that Interconnect Renewable Energy Sources to the Grid"; IEEE; 2016; 4 Pages.

* cited by examiner

PUSH-PULL CONVERTER WITH REDUCED EMI AND VOLTAGE SPIKES

CROSS-REFERENCE TO RELATED APPLICATIONS

This application is a continuation of U.S. application Ser. No. 16/838,642, filed Apr. 2, 2020, which issued as U.S. Pat. No. 11,437,919, which claims the benefit of GB Patent Application No. 1909543.9, filed Jul. 2, 2019, which are both incorporated herein by reference in their entirety.

TECHNICAL FIELD

This disclosure relates to a power supply circuit, in particular a cascaded dual mode power supply circuit, including a push-pull converter, suitable for aerospace and automotive electronic systems such as electric propulsion systems and/or air management systems.

BACKGROUND ART

Power supplies used in aerospace/automotive electronic systems, such as embedded electronic systems, must adhere to stringent Radio Frequency Emissions industry standards. Typical industry standards that form the basis of requirements are DO-160G and CISPR25 for aerospace and automotive systems respectively.

These power supplies act to take a supply voltage, such as a 28 V supply in an aerospace environment, and convert it to one or more application voltages, which are typically much lower.

Power supplies used in mobile electronics may be subject to electrical transients, which can result in either significant input voltages or power source interruption. Full function and performance is required for a defined period during interruption of the input power source. For 28 VDC fed aerospace power supplies, 'Lightning Insulation' requirements dictate that isolated topologies are utilised. Furthermore, multiple outputs are often required in order to satisfy the system need for differing load voltage requirements and loading. Typically, only the main output is tightly regulated, whilst all other outputs are designated as 'semi-regulated' outputs.

This combination of challenging requirements often result in the selection of converter topologies with discontinuous input currents, e.g. 'flyback converters' or 'buck-derived converters' with coupled output inductors. However, the use of discontinuous input currents may give rise to unwanted interference that can have a detrimental effect on surrounding circuitry. Conducted Emissions requirements specify that this must be minimised.

In order to satisfy the Conducted Emissions requirements, a system that employs discontinuous input currents may necessitate the inclusion of significant differential mode filtering at the power supply input in order to satisfy the Conducted Emissions requirements arising from the large pulsating supply currents associated with the flyback or buck-derived converter topology in use.

A power supply system is often arranged such that a dedicated converter stage is employed to charge a series-connected energy storage function so as to provide 'hold-up' capability. Those skilled in the art will appreciate that 'hold-up' capability means that in the event that the input voltage drops below a tolerable level or cuts out altogether. Prior art arrangements may employ suitable 'pre-regulator' to convert the required load power to an intermediate voltage for the entire duration of the powered phase, however this may adversely impact the power dissipation, cost, weight, size, and/or reliability of the system.

In addition to scenarios in which the supply voltage drops too low, such a power supply must also be able to deal with unwanted spikes in the input voltage where it is temporarily greater than a tolerable amount. Conventional power supplies known in the art per se typically have some means to suppress these transients of increased voltage such as transorbs. However, such a mechanism does not necessary clip the increased voltage to the 'normal' voltage. For example, a 28 V supply in an aerospace application may experience a transient spike to 1500 V, which a typical transient voltage suppressor may be able to reduce to around 120 V, which is still far greater than the normal voltage. There remains, therefore, some residual transient even after suppression so the power supply should be able to handle the residual transient to prevent potentially causing damage to the application circuits supplied by the power supply.

SUMMARY OF THE DISCLOSURE

In accordance with a first aspect, the present disclosure provides a power supply circuit comprising:
a push-pull portion comprising a transformer having a primary winding and a secondary winding, wherein a first terminal of the primary winding is connected to ground via a first switch, and wherein a second terminal of the primary winding is connected to ground via a second switch;
an inductor having a first terminal thereof connected to an input voltage via a third switch, wherein a second terminal of the inductor is connected to a centre tap on the primary winding of the transformer;
an energy storage portion connected between the primary winding of the transformer and ground, said energy storage portion being further connected to the first terminal of the inductor via a fourth switch; and
a controller arranged to monitor the input voltage, to apply a first pulse width modulated (PWM) signal to the first switch, and to apply a second PWM signal to the second switch, wherein said first and second PWM signals partially overlap, said controller being further arranged such that:
when the input voltage is between a first threshold and a second threshold greater than said first threshold, the controller operates the circuit in a first mode in which the controller closes the third switch and opens the fourth switch;
when the input voltage is above the second threshold, the controller operates the circuit in a second mode in which the controller applies a third PWM signal to the third switch and opens the fourth switch; and
when the input voltage is below the first threshold, the controller operates the circuit in a third mode in which the controller closes the third switch and applies a fourth PWM signal to the fourth switch.

Thus it will be appreciated that aspects of the present disclosure provide an improved power supply circuit that draws continuous current when operated in the normal input voltage range (i.e. the first mode). The power supply operates in this mode during much of the operational life, while operational time spent in the second and third modes (which may have discontinuous input currents) is typically very small. Compliance with Conducted Emissions requirements may be tested in the normal (i.e. first) mode.

It will be appreciated that a PWM signal is a signal that alternates between an 'active' or 'mark' state (in which it closes a switch to which it is applied) and a 'space' state (in which it opens a switch to which it is applied). Whether the 'mark' and 'space' are a digital '1' or '0' depend on the type of switch in use and these are interchangeable with one another. For example, the switches may be 'active low' switches, which are closed when their respective control signal is low, i.e. the 'mark' of the control signal is '0', and the duty cycle is the proportion of a given cycle in which the appropriate control signal has the value '0'.

Those skilled in the art will appreciate that the term 'partially overlapping' as used herein with respect to the first and second PWM signals means that there is a period in which both of the first and second PWM signals are in their mark state and that at least one of them is always on at any given time during regular operation, i.e. the first and second switches are never both open at the same time during regular operation of the device. Thus operation of the push-pull portion involves cycling through the following states: both the first and second switches are closed; the first switch is open and the second switch is closed; both the first and second switches are closed; the first switch is closed and the second switch is open. As will be appreciated by those skilled in the art, this operation cycle means that the power supply circuit is a 'current-fed' arrangement.

When both the first and second switches are closed (i.e. during the 'on-time'), both ends of the primary winding of the transformer are grounded and thus the primary winding is shorted, i.e. the primary winding has effectively zero inductance. As a result, the centre tap of the primary winding is, in effect, grounded. This advantageously provides a mechanism for grounding the centre tap of the primary winding to which the second terminal of the inductor is connected without the need for an additional switch to ground that node.

The term 'duty cycle' as used in relation to the transformer itself refers to the proportion of a given cycle in which both ends of its primary winding are shorted to ground, i.e. when the first and second PWM signals overlap.

Preferably, the third PWM signal applied to the third switch in the second (i.e. overvoltage) mode has its respective active or mark state only when the first and second PWM signals are both in their respective active or mark states, i.e. during their period of overlap. Thus in some examples, the third PWM signal is in a respective mark state thereof only when the first and second PWM signals are both in their respective mark states. It should be noted that, in such examples, while the third PWM signal is in its mark state only when both the first and second PWM signals are in their mark state, this does not mean that the third PWM signal is in its mark state at all times that the first and second PWM signals are in their mark state, merely that the third PWM signal is not in its mark state at any other time.

Similarly, the fourth PWM signal applied to the fourth switch in the third (i.e. hold-up) mode preferably has its respective active or mark state only when the first and second PWM signals are both in their respective active or mark states, i.e. during their period of overlap. Thus in some examples, the fourth PWM signal is in a respective mark state thereof only when the first and second PWM signals are both in their respective mark states. It should be noted that, in such examples, while the fourth PWM signal is in its mark state only when both the first and second PWM signals are in their mark state, this does not mean that the fourth PWM signal is in its mark state at all times that the first and second PWM signals are in their mark state, merely that the fourth PWM signal is not in its mark state at any other time.

In some examples, the controller comprises a PWM generator arranged to produce the first and second PWM signals. The PWM generator may also generate the third and/or fourth PWM signals, or these may be derived from the first and second PWM signals, e.g. using a logical 'AND' function, either by the PWM generator or by another part of the controller. The controller may comprise a switch drive unit that, in some examples, produces and supplies respective control signals that open and close the third and fourth switches as appropriate. This switch drive unit may, in a set of such examples, receive the third and/or fourth PWM signals and apply these to the third and/or fourth switches in the second and/or third modes as appropriate.

It will be appreciated by those skilled in the art that the value of the input voltage may be determined using suitable approaches known in the art per se. However, in some examples, the power supply circuit further comprises an input voltage sense unit arranged to determine a magnitude of the input voltage and to supply said determined magnitude to the controller, such that the controller compares the determined magnitude of the input voltage to the first and second thresholds. Such an input voltage sense unit advantageously provides a mechanism to determine the value of the input voltage. In some examples, the controller may comprise the input voltage sense unit, however the input voltage sense unit may be separate to the controller in other examples.

In some potentially overlapping examples, the power supply circuit further comprises an output voltage sense unit arranged to determine a magnitude of the output voltage and to supply said determined magnitude to the controller, wherein the controller compares the determined magnitude to a reference value and adjusts at least one of the first, second, third, and fourth PWM signals based on a difference between the determined magnitude and the reference value. Such a voltage sense unit advantageously provides a mechanism to determine the value of the output voltage. The controller may adjust the duty cycle and/or frequency of the PWM signals as appropriate in order to drive the output voltage toward the target output voltage in a manner known in the art per se.

Preferably, the power supply circuit has means to prevent current flowing the wrong way through the circuit, e.g. back to the supply voltage. In some examples, the power supply circuit comprises a forward bias diode connected between the third switch and the first terminal of the inductor. This protective forward bias diode acts to prevent a 'back flow' of current from the fourth switch to the input voltage during the hold-up (i.e. third) mode, which could otherwise divert stored energy to the input supply instead of to the output.

Similarly, in some potentially overlapping examples, the power supply circuit comprises a reverse bias diode connected between the first terminal of the inductor and ground. This reverse bias diode acts as a freewheel diode for the inductor during the overvoltage (i.e. second) mode. This diode also provides freewheel functionality during the hold-up (i.e. third) mode outside of the periods in which the first and second PWM signals overlap, i.e. during the 'off-time'.

It will be appreciated that the energy storage portion stores energy during the normal (i.e. first) mode and releases it via the fourth switch during the hold-up (i.e. third) mode, providing the hold-up capability of the power supply circuit. In some examples, the energy storage portion comprises a capacitor having a first terminal thereof connected to the first and second terminals of the primary winding, said capacitor having a second terminal thereof connected to ground, wherein the first terminal of the capacitor is further connected to the first terminal of the inductor via the fourth switch. In some such examples, the first terminal of the capacitor is connected to the first and second terminals of the primary winding via a resistor. This resistor provides for 'trickle charging' of the capacitor.

The output of the power supply circuit may be taken from the secondary winding of the transformer. In some examples, the secondary winding is connected to an output portion comprising first and second output terminals, wherein a first terminal of the secondary winding is connected to the first output terminal via a first forward bias output diode, a second terminal of the secondary winding is connected to the first output terminal via a second forward bias output diode, and wherein the second output terminal is connected to a centre tap of the secondary winding. In some such examples, a decoupling capacitor is connected between the first and second output terminals.

The output voltage may, in accordance with such examples, be taken across the first and second output terminals, where the first output terminal provides an output voltage rail and the second output terminal provides the output voltage return, i.e. effective ground for circuits connected to the output of the power supply circuit.

During the normal (i.e. first) mode, it is preferred that the voltage at the second terminal of the inductor (i.e. at the centre tap of the primary winding of the transformer) remains higher than the voltage at the first terminal of the inductor during the time in which the first and second PWM signals do not overlap (i.e. the off-time). The output portion may ensure this because the voltage across the output terminals (connected to the secondary winding) restricts the voltage at the centre tap of the primary winding, in accordance with the turns ratio between the primary and secondary windings.

Generally, power supply circuits known in the art per se may only have a single 'tightly regulated' output, and may have one or more further outputs that are not tightly regulated. In some examples, the transformer comprises a plurality of secondary windings. It will be appreciated that, in accordance with such examples, each secondary winding provides a separate 'tightly regulated' output due to the current-fed transformer and the turns ratio. Each of these secondary windings may be connected to a separate, respective output portion.

This is novel and inventive in its own right and thus, when viewed from a second aspect, the present disclosure provides a power supply circuit comprising:
 a push-pull portion comprising a transformer having a primary winding and a secondary winding, wherein a first terminal of the primary winding is connected to ground via a first switch, and wherein a second terminal of the primary winding is connected to ground via a second switch;
 an inductor having a first terminal thereof connected to an input voltage via a third switch, wherein a second terminal of the inductor is connected to a centre tap on the primary winding of the transformer;
 an energy storage portion connected between the primary winding of the transformer and ground, said energy storage portion being further connected to the first terminal of the inductor via a fourth switch; and
 a plurality of output portions, each comprising first and second output terminals, wherein a first terminal of each secondary winding is connected to the first output terminal of a corresponding output portion via a respective first forward bias output diode, a respective second terminal of each secondary winding is connected to the respective first output terminal via a respective second forward bias output diode, and wherein the respective second output terminal is connected to a centre tap of the respective secondary winding.

In some examples of this second aspect, the power supply circuit comprises a controller arranged to monitor the input voltage and to operate the first, second, third, and fourth switches, said controller being arranged to apply a first pulse width modulated (PWM) signal to the first switch, and applies a second PWM signal to the second switch, wherein said first and second PWM signals partially overlap. In a set of such examples, the controller is further arranged such that:
 when the input voltage is between a first threshold and a second threshold greater than said first threshold, the controller operates the circuit in a first mode in which the controller closes the third switch and opens the fourth switch;
 when the input voltage is above the second threshold, the controller operates the circuit in a second mode in which the controller applies a third PWM signal to the third switch and opens the fourth switch; and
 when the input voltage is below the first threshold, the controller operates the circuit in a third mode in which the controller closes the third switch and applies a fourth PWM signal to the fourth switch.

Optional features described hereinabove in relation to the first aspect of the disclosure apply equally, as appropriate, to the second aspect of the disclosure. For example, as in the first aspect of the disclosure, examples of the second disclosure may have the controller arranged to modulate the first and second PWM signals to drive the output voltage toward a predetermined value.

BRIEF DESCRIPTION OF THE DRAWINGS

Certain examples of the present disclosure will now be described with reference to the accompanying drawings, in which.

DETAILED DESCRIPTION

Figure 1:
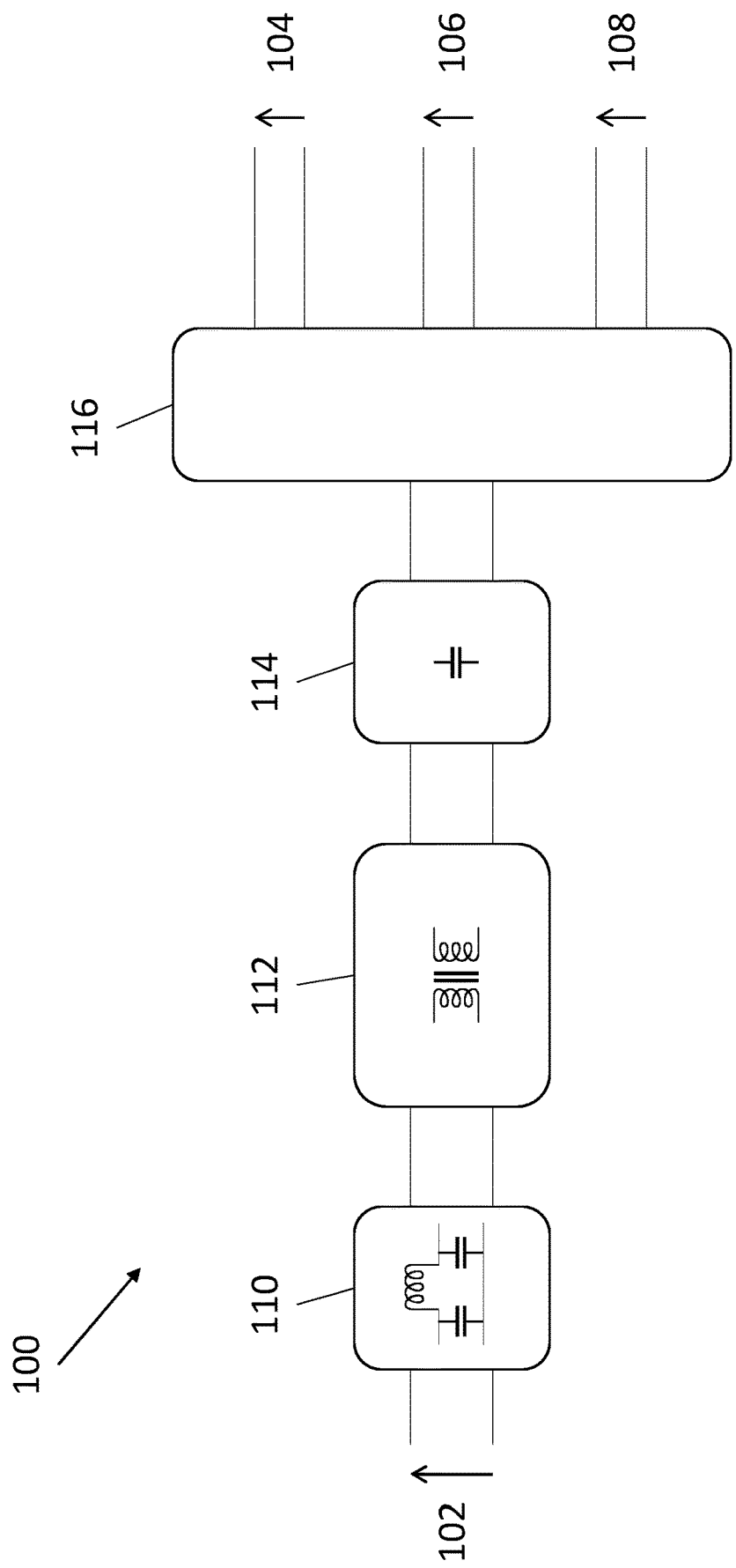
FIG. 1 is block diagram of a prior art power supply circuit.

FIG. 1 is block diagram of a prior art power supply circuit 100 arranged to receive an input voltage 102 and produce a number of output voltages 104, 106, 108. In this circuit 100, the first output voltage 104 is 'tightly regulated', while the other two output voltages 106, 108 are only 'semi regulated'. In general, the circuit 100 may provide N output voltages, where the first output voltage 104 is tightly regulated, but the other N−1 output voltages are only semi-regulated.

The power supply circuit 100 of FIG. 1 comprises an electromagnetic compatibility (EMC) filter 110, a flyback stage 112, series-connected energy storage 114, and a buck stage 116. The flyback stage 112 and buck stage 116, in effect, provide a two-stage converter architecture in order to provide 'hold-up' capability, i.e. so that the circuit 100 can maintain the output voltages 104, 106, 108 at their required value, even if the input supply 102 drops low or to zero (i.e. in the case of a brownout, slump, or loss of power).

The flyback converters stage 112 and the buck stage 116 within the circuit 100 of FIG. 1 will make use of discontinuous input currents, which will typically give rise to unwanted interference that can have a detrimental effect on surrounding circuitry. Conducted Emissions requirements specify that this must be minimised, and so the EMC filter 110 is included at the power supply input (i.e. connected to the input supply 102) in order to satisfy the Conducted Emissions requirements arising from the large pulsating supply currents associated with the flyback stage 112 and the buck stage 116 that are in use.

The series-connected energy storage 114 is, in practice, a capacitor which stores charge in one cycle of the circuit 100, and releases that charge in another cycle. Those skilled in the art will appreciate that the energy stored in a capacitor follows the characteristic equation $E=\frac{1}{2}CV^2$, where E is energy, C is capacitance, and V is the voltage across the capacitor. Accordingly, the output voltage of the flyback stage 112 is stepped up compared to its input voltage for storage on the capacitor. If the supply voltage 102 is lost or degraded, the capacitor (i.e. the energy storage 114) releases its stored energy, supplementing the loss of the supply voltage 102. Stepping up the voltage across the capacitor in this way has a significant impact on the amount of energy stored.

The first output voltage 104 is sensed by a feedback loop (not shown), which controls operation of the buck stage 116 so as to drive the first output voltage 104 to a desired set point. Typically this is achieved by controlling the duty cycle of signals applied to a pair of switches within the buck stage 116 so as to discontinuously draw current from the input supply at a rate that leads to an output voltage of the desired magnitude.

Prior art systems having one tightly regulated output and one or more semi-regulated outputs, known in the art per se, may either employ multiple output flyback converters or multiple output forward converters.

In a system having multiple output flyback converters, the first output—from which the first output voltage 104 is taken—is designated as the main output and the feedback circuit is used to sense this output, a controller adjusts the duty cycle to reduce any errors. Due to the storing of energy during the on time, $t_{on}$, the input current will reach some maximum peak, $I_p$, at the end of $t_{on}$. This current will be transferred to the secondary when the power switch is turned "off". The important point in understanding the cross-regulation is how this transferred current is shared between the secondary windings. Initially, the majority of the current will be transferred to the output which has the smallest leakage inductance. If this output is not used by the feedback to control the PWM, peak rectification will occur on that output. If this output is used as the feedback, the duty cycle will be reduced which in turn will reduce the other outputs.

Alternatively, in systems that use multiple output forward converters, each output features an inductor, secondary-side diodes and transformer secondary leakage in series. One output is designated as the main output and the feedback circuit is used to sense this output, the controller adjusts the duty cycle to reduce any errors. For any fixed value of duty cycle, load changes on semi-regulated output do not fully translate to output changes on the regulated output, since the series output components and parasitic leakage somewhat decouple the two outputs from each other.

As outlined in further detail below, the current-fed push-pull stage provided in accordance with examples of this disclosure relocates the multiple secondary-side inductors to the primary-side, combining them into a single inductor in the process. The Applicant has appreciated that eliminating inductors from the output-side circuit removes series voltage drops, therefore improving the cross-regulation between outputs.

Figure 2:
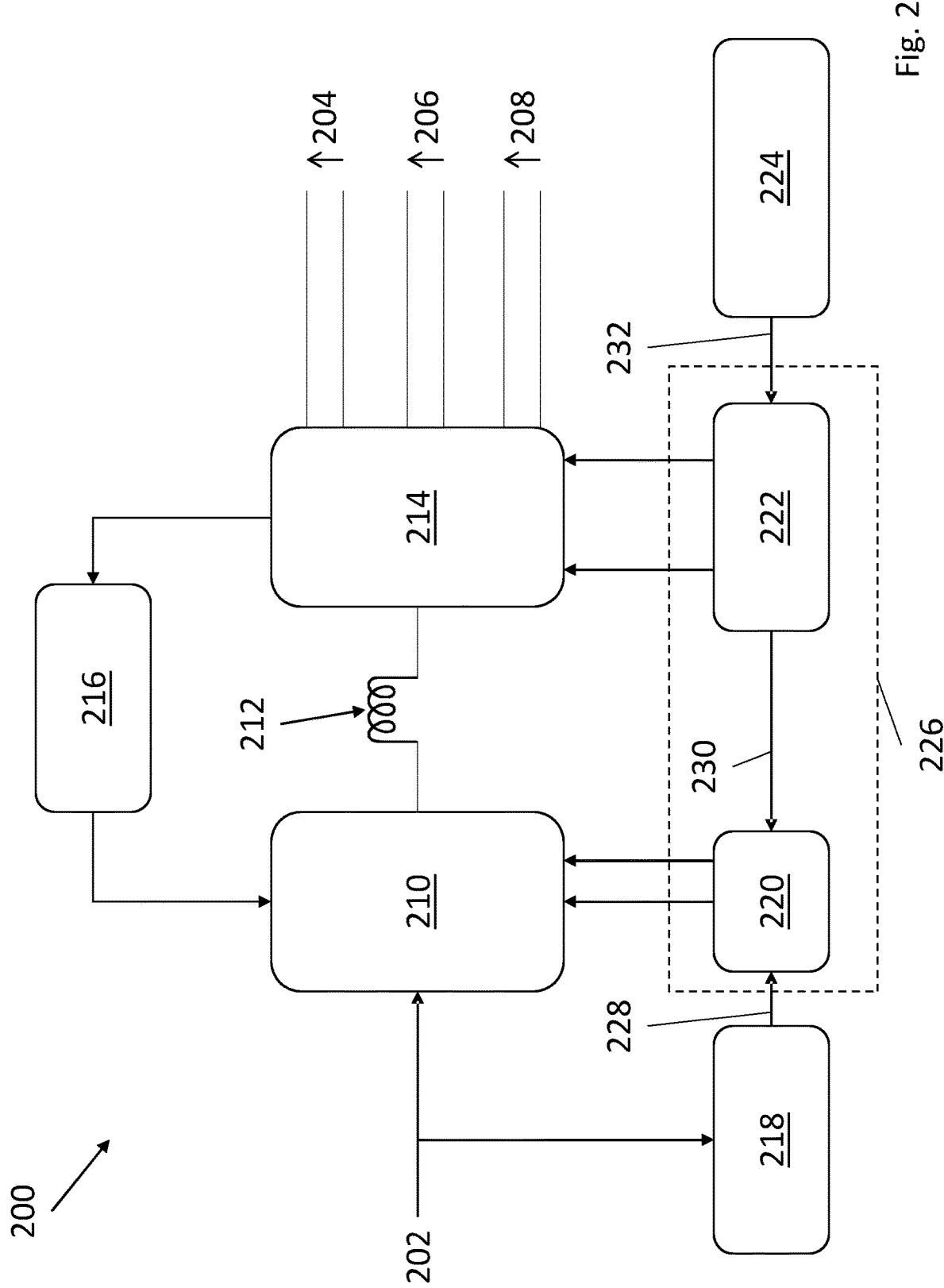
FIG. 2 is a block diagram of a power supply circuit in accordance with an example of the present disclosure.

FIG. 2 is a block diagram of a power supply circuit 200 in accordance with an example of the present disclosure. The power supply circuit 200 of FIG. 2 is arranged to receive an input supply voltage 202 and produce a number of output voltages 204, 206, 208. Unlike the prior art converter 100 described above with reference to FIG. 1, all of the output voltages 204, 206, 208 in the power supply circuit 200 of FIG. 2 are tightly regulated, as discussed in further detail below. While three output voltages 204, 206, 208 are shown, in practice there may be N output voltages, where all N may be tightly regulated.

The circuit 200 of FIG. 2 comprises: a two-input switch stage 210; an inductor 212; a push-pull portion 214; an energy storage portion 216; an input voltage sense unit 218; a switch drive 220; a PWM controller 222; and an output voltage sense unit 224. The construction of these various logical blocks is described in further detail below with reference to FIG. 3.

The switch drive 220 and the PWM controller 222 are grouped together in FIG. 1 as a controller 226, however it will be appreciated that in practice these may be independent units or may be part of a single controller unit, e.g. a microprocessor.

The input supply voltage 202 is provided to the two-switch stage 210, which is operated by the switch drive 220, which in turn receives as an input a determined magnitude 228 of the input supply voltage 202 from the input voltage sense unit 218. The switch drive 220 also receives a PWM control signal 230 from the PWM controller 222, which produces the PWM control signal 230 based on a magnitude 232 of the output voltage(s), as determined by the output voltage sense unit 224.

The control signals (described in further detail below) supplied to the two-switch stage 210 by the switch drive 220 determine the voltage $V_{buck}$ at the input terminal of the inductor 212 (i.e. the left hand side of the inductor 212). The voltage $V_{boost}$ at the output terminal of the inductor 212 (i.e. the right hand side of the inductor 212) is supplied to the push-pull portion 214 by way of the connection between the second terminal of the inductor 212 and the centre tap of the primary winding of the transformer 234. Generally, the voltage $V_{boost}$ at the output terminal of the inductor 212 is always higher than the voltage $V_{buck}$ at the input terminal of the inductor 212 during the off-time in the normal mode of operation.

The push-pull portion 214 acts to convert the voltage $V_{boost}$ at the output terminal of the inductor 212 to a desired value in order to provide the output voltages 204, 206, 208. During the off-time, energy from the push-pull portion 214 is 'fed back' through the energy storage portion 216, which stores this energy for use if the input voltage supply 202 drops below a tolerable limit, e.g. in the case of a power slump or outage. As outlined in further detail below with reference to FIG. 3, the energy storage portion 216 includes a parallel-connected capacitor C1.

The various elements of the power supply circuit 200 are described in further detail with reference to FIG. 3, which is a circuit diagram of the power supply circuit 200 of FIG. 2. The input voltage supply 202 is shown here as having a positive supply $V_{in}$ and a return terminal $V_{in\_rtn}$, i.e. ground.

Figure 3:
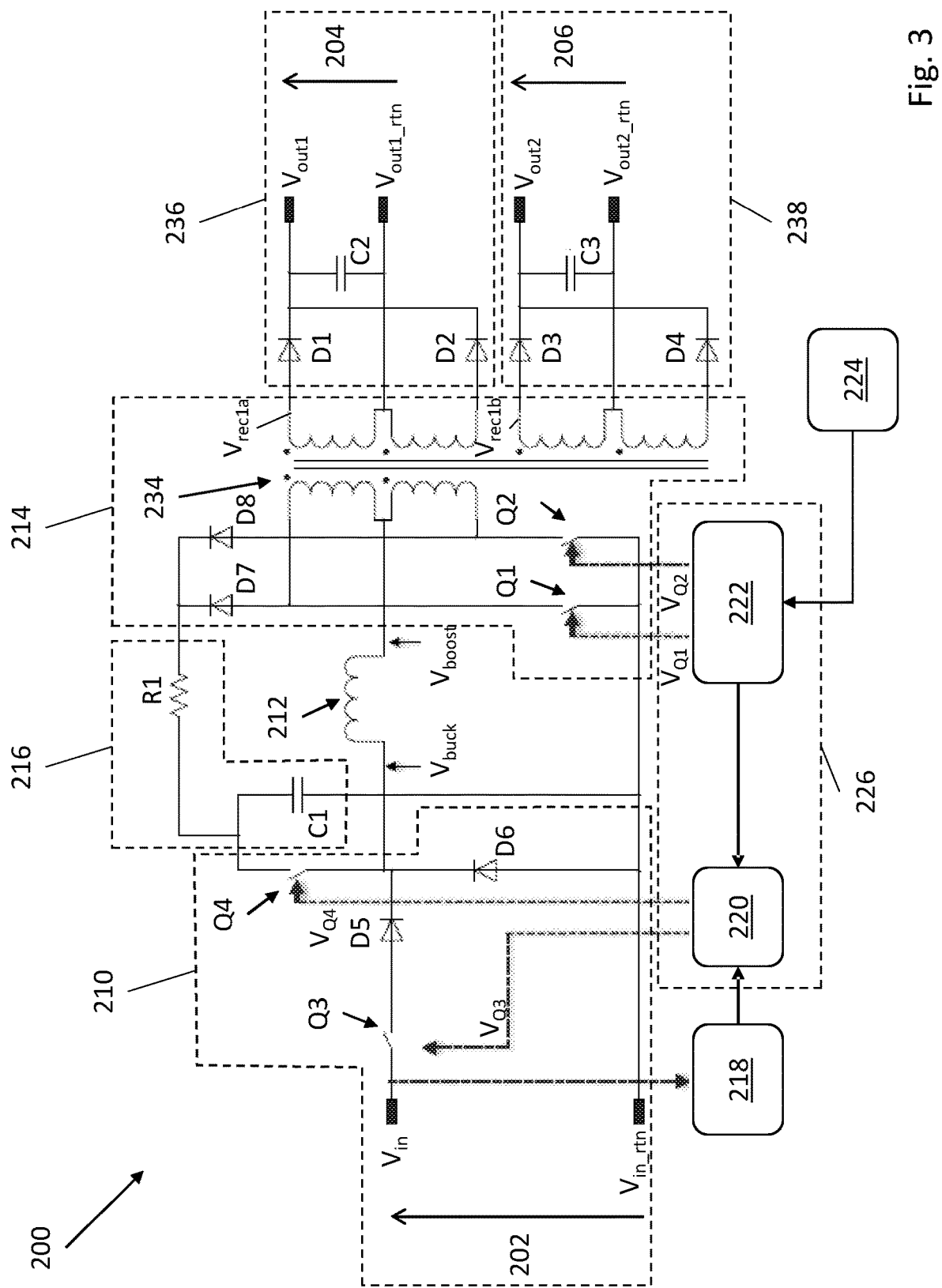
FIG. 3 is a circuit diagram of the circuit of FIG. 2.

It can be seen in FIG. 3 that the push-pull portion 214 comprises a transformer 234 having a primary winding and multiple secondary windings. It should be noted that, for the sake of clarity, only two secondary windings are shown in the circuit diagram of FIG. 3, however there may generally be a separate secondary winding for each output voltage 204, 206, 208 (where the secondary winding and corresponding output portion that provide the output voltage 208 are not shown in FIG. 3, but would be alike in construction to those that supply the other output voltages 204, 206).

Each secondary winding is connected to a respective output portion 236, 238, where the first output portion 236 provides the first output voltage 204 and the second output portion 238 provides the second output voltage 206.

The first output portion 236 comprises first and second forward bias diodes D1, D2, and a capacitor C2. A first terminal (i.e. one end) of the first secondary winding is connected to an output terminal that supplies the first output voltage $V_{out1}$ via the first diode D1. The second terminal (i.e. the other end) of the first secondary winding is connected to the output terminal that supplies the first output voltage $V_{out1}$ via the second diode D2. The centre tap of the first secondary winding of the transformer 234 is connected to a further output that provides a first output voltage return $V_{out1\_rtn}$, i.e. ground for downstream circuitry arranged to receive the first output voltage 204. The capacitor C2 acts as a decoupling capacitor between the two output terminals of the first output portion 236.

Similarly, the second output portion 238 comprises third and fourth forward bias diodes D3, D4, and a capacitor C3. A first terminal (i.e. one end) of the second secondary winding is connected to an output terminal that supplies the second output voltage $V_{out2}$ via the third diode D3. The second terminal (i.e. the other end) of the second secondary winding is connected to the output terminal that supplies the second output voltage $V_{out2}$ via the fourth diode D4. The centre tap of the second secondary winding of the transformer 234 is connected to a further output that provides a second output voltage return $V_{out2\_rtn}$, i.e. ground for downstream circuitry arranged to receive the second output voltage 206. The capacitor C3 acts as a decoupling capacitor between the two output terminals of the second output portion 238.

A first terminal (i.e. one end) of the primary winding is connected to the input voltage return terminal $V_{in\_rtn}$ via a first switch Q1. A second terminal (i.e. the other end) of the primary winding is connected to ground via a second switch Q2. The terminals of the primary winding are also connected to the energy storage portion 216, as described further below.

The two-switch portion 210 comprises a third switch Q3 and a fourth switch Q4. The inductor 212 has a first terminal connected to the input voltage (i.e. to the positive supply terminal $V_{in}$) via the third switch Q3. A fifth forward bias diode D5 is arranged between the third switch Q3 and the input terminal of the inductor 212, where this diode D5 prevents reverse flow of current from the inductor 212 to the input voltage terminal $V_{in}$, which could otherwise cause energy stored in the capacitor C1 to flow into the input supply $V_{in}$ during PWM operation of the fourth switch Q4. A further diode D6 acts as a freewheel diode when the third switch Q3 or the fourth switch Q4 is controlled via the respective PWM control signal.

The energy storage portion 216 comprises the capacitor C1 as outlined above and a fixed resistor R1. The terminals of the primary winding of the transformer 234 are each connected to a first terminal of the resistor R1 via a respective forward bias diode D7, D8. The second terminal of the resistor R1 is connected to a first terminal of the capacitor C1, while the second terminal of the capacitor C1 is connected to the input voltage return terminal $V_{in\_rtn}$, i.e. ground. The second terminal of the resistor R1 and the first terminal of the capacitor C1 are also connected to the first terminal of the inductor 212 via the fourth switch Q4.

The switches Q1, Q2, Q3, Q4 are each controlled by the controller 226. Specifically, the two switches Q1, Q2 connected to the primary winding of the transformer 234 within the push-pull portion 214 are controlled by the PWM controller 222 while the switches Q3, Q4 within the two-switch portion 210 are controlled by the switch drive 220. The operation of these switches Q1, Q2, Q3, Q4 is described in further detail below. The three operational modes of the circuit are outlined with reference to FIGS. 4A, 4B, 5, and 6, and these modes are described in greater detail with reference to FIGS. 7 to 11.

Figure 4A:
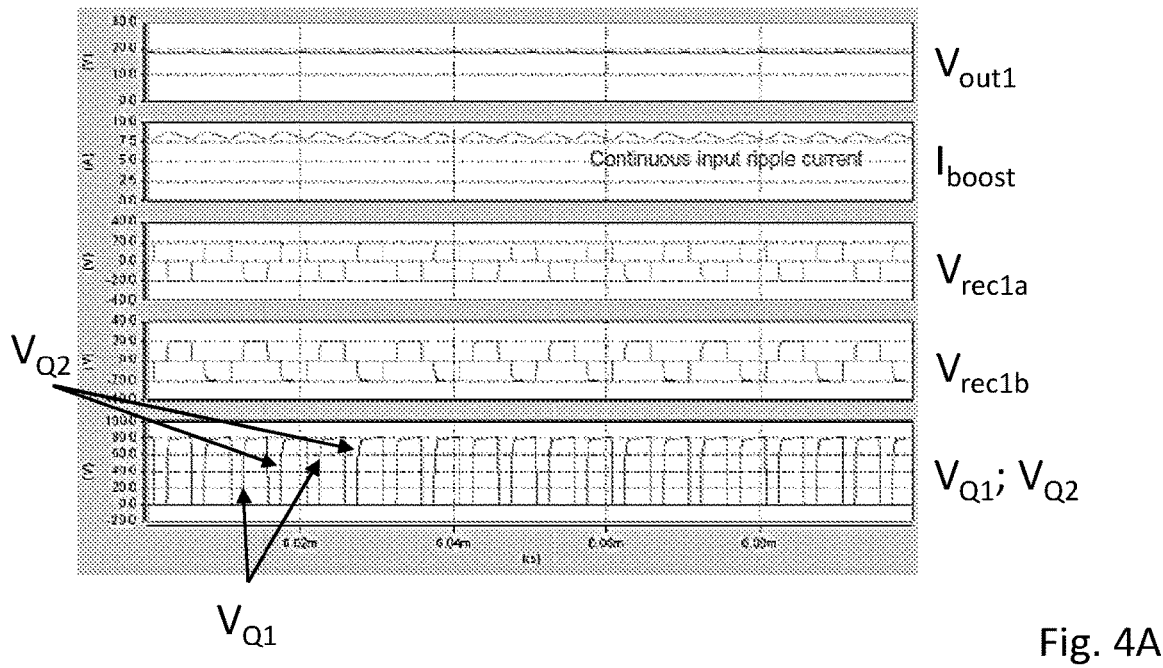
FIGS. 4A and 4B are graphs showing operation of the circuit of FIG. 2 in its normal mode.
Figure 4B:
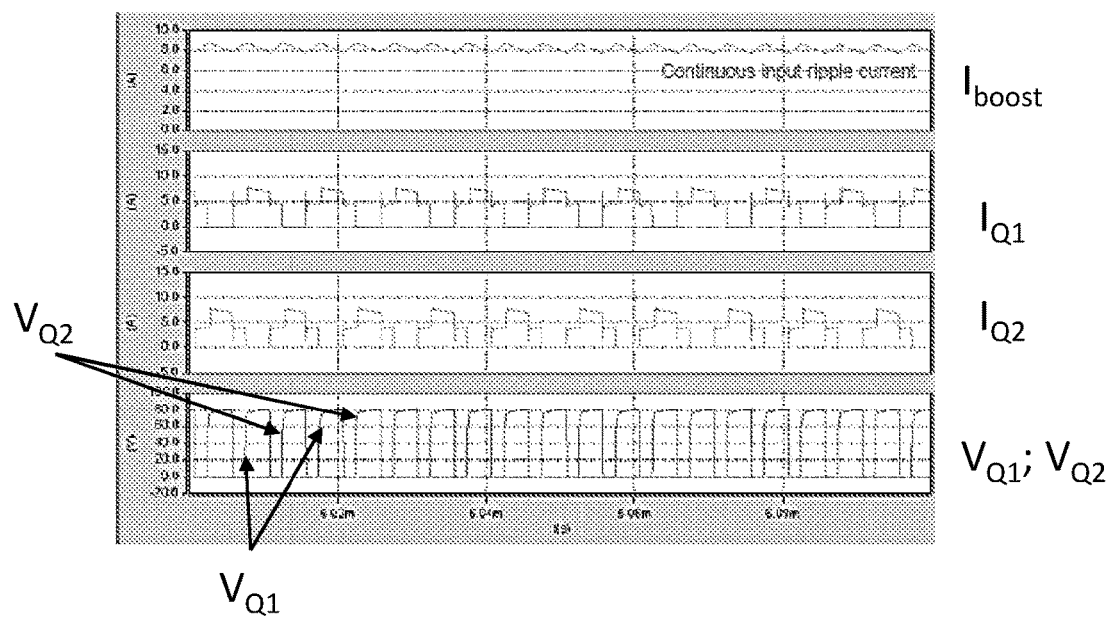

FIGS. 4A and 4B are graphs showing operation of the circuit 200 of FIG. 2 in its normal mode. The 'normal' mode of operation is carried out by the power supply circuit 200 when the input voltage 202 is within the normal desired range. In an aerospace application, this may be the 'aircraft voltage' of 28 VDC. As long as the input voltage 202 is within some acceptable tolerance of 28 VDC, the normal mode is used.

The plots shown in FIG. 4A, from top to bottom, are: the first output voltage $V_{out1}$ (i.e. the voltage across the output 204); the inductor current (and hence input current during the normal mode of operation) $I_{boost}$ supplied to the centre tap of the primary winding of the transformer 234; the voltage $V_{rec1a}$ at the anode of the first diode D1 in the first output portion 236; the voltage $V_{rec1b}$ at the anode of the second diode D2 in the first output portion 236; and the voltages $V_{Q1}$, $V_{Q2}$ at the respective drain terminals of the switches Q1, Q2 in the push-pull portion 214.

The plots shown in FIG. 4B, from top to bottom, are: the input current $I_{boost}$ supplied to the centre tap of the primary winding of the transformer 234; the current $I_{Q1}$ through the first switch Q1 in the push-pull portion 214; the current $I_{Q2}$ through the second switch Q2 in the push-pull portion 214; and the voltages $V_{Q1}$, $V_{Q2}$ at the respective drain terminals of the switches Q1, Q2 in the push-pull portion 214.

As can be seen in FIGS. 4A and 4B, the input current $I_{boost}$ supplied to the centre tap of the primary winding of the transformer 234 is continuous throughout normal operation, i.e. it is not 'pulsed' on as is the case with operation of conventional power supply circuits, e.g. the prior art circuit 100 of FIG. 1. This advantageously reduces the generation of significant electromagnetic interference that can cause issues, e.g. with neighbouring radio equipment. This may remove the need to supply significant additional circuitry, e.g. filters, to prevent interference with neighbouring circuitry, i.e. the circuit 200 may comply with the appropriate regulatory requirements without the cost, weight, and size drawbacks associated with conventional approaches.

The voltages $V_{Q1}$, $V_{Q2}$ at the respective drain terminals of the switches Q1, Q2 in the push-pull portion 214 are each a PWM voltage, and are partially overlapping. As can be seen in the plots of FIGS. 4A and 4B, these voltages $V_{Q1}$, $V_{Q2}$ have the same frequency and duty cycle, but are out of phase with one another. Similarly, the respective currents $I_{D1}$, $I_{D2}$, $I_{Q1}$, $I_{Q2}$ are out of phase with one another, where the positive current through each of these components depends on which half of the primary winding of the transformer 234 is active during any given cycle.

Due to the partial overlap between these PWM voltages $V_{Q1}$, $V_{Q1}$, periodically both voltages $V_{Q1}$, $V_{Q2}$ are low simultaneously. In the present circuit 200, the switches Q1, Q2, Q3, Q4 are active high and normally open, such that when their respective control signal is 'high', the switch closes. This partial overlap means that one switch Q1, Q2 in the push-pull portion 214 is to be switched off (i.e. opened), the other switch Q1, Q2 is first switched on, i.e. providing a make-before-break arrangement.

Figure 5:
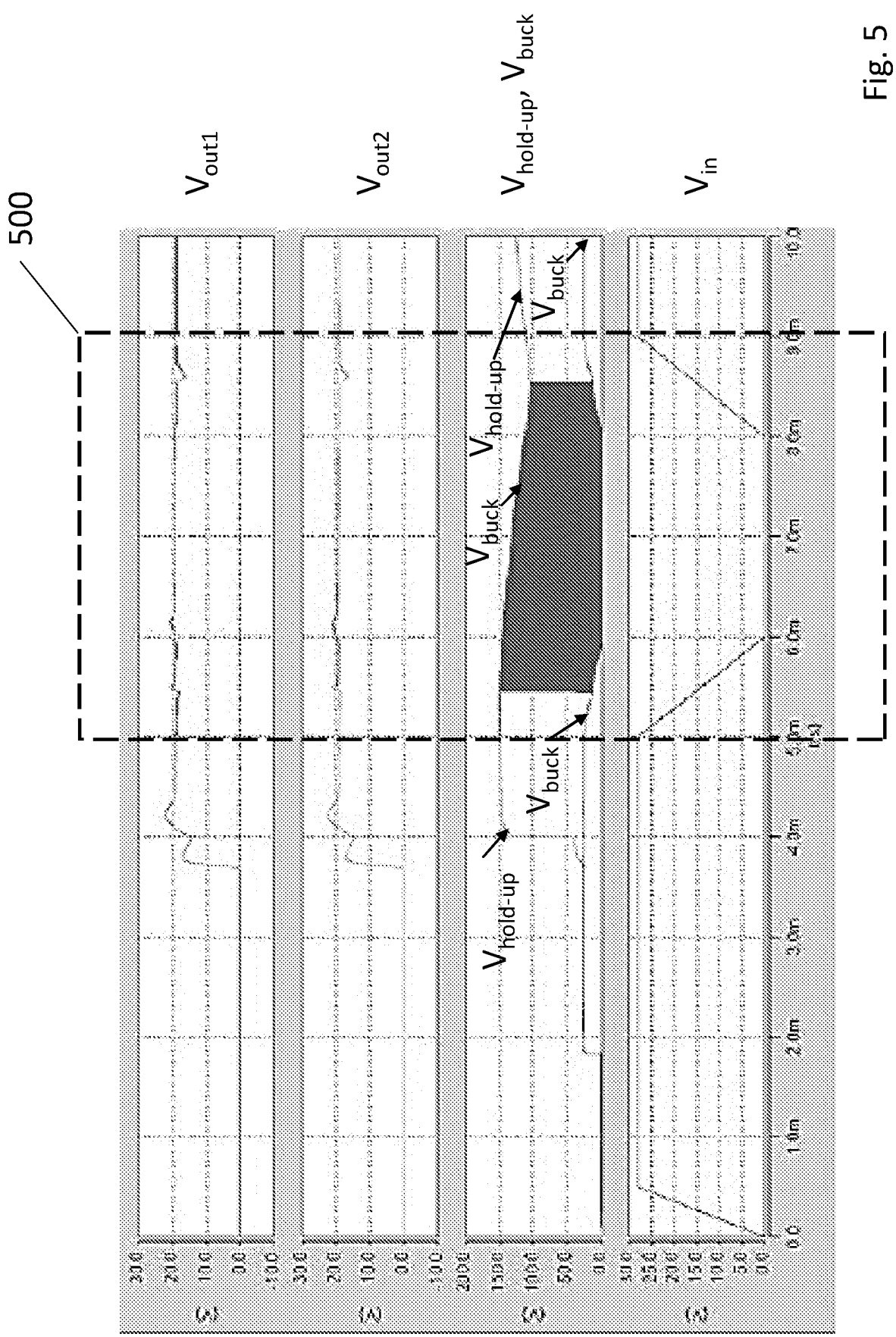
FIG. 5 is a graph showing operation of the circuit of FIG. 2 in its hold-up mode.

FIG. 5 is a graph showing operation of the circuit of FIG. 2 in its hold-up mode. The 'hold-up' mode of operation is carried out by the power supply circuit 200 when the input voltage 202 is below the normal desired range, e.g. due to a loss of the input voltage supply or due to a brownout. Thus if the input voltage 202 falls below 28 VDC to a lower threshold value, the hold-up mode is used.

The plots shown in FIG. 5, from top to bottom, are: the first output voltage $V_{out1}$ (i.e. the voltage across the output 204); the second output voltage $V_{out2}$ (i.e. the voltage across the output 206); the hold-up voltage $V_{hold-up}$ provided by the capacitor C1 in the hold-up mode and the voltage $V_{buck}$ at the input of the inductor 212; and the input supply voltage $V_{in}$.

As can be seen in FIG. 5, the input supply voltage $V_{in}$ drops to zero during a brief time window 500, i.e. dropping from its normal value of 28 VDC to 0 VDC. At this stage, the input voltage sense unit 218 determines that the input supply voltage $V_{in}$ has fallen below a lower threshold value and enables the hold-up mode, as explained in further detail with respect to FIGS. 8 and 9. During this time window 500, the output voltages—i.e. the first output voltage $V_{out1}$ and the second output voltage $V_{out2}$—both remain relatively constant, despite the drop in the input supply voltage $V_{in}$. This is achieved by the capacitor C1 providing the hold-up voltage $V_{hold-up}$ to the input of the inductor 212, such that the transformer 234 remains powered throughout the time window 500.

Figure 6:
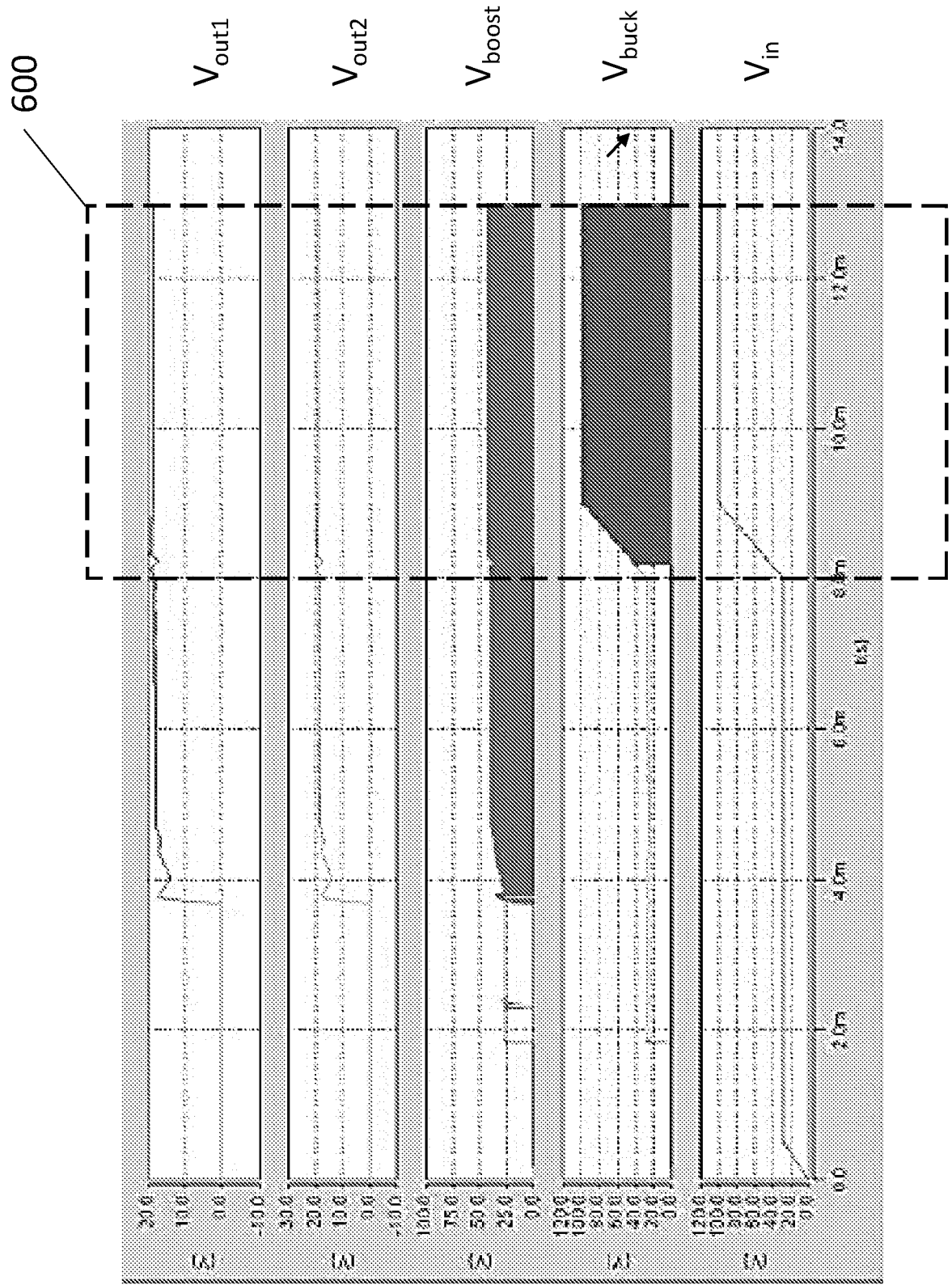
FIG. 6 is a graph showing operation of the circuit of FIG. 2 in its overvoltage mode.

FIG. 6 is a graph showing operation of the circuit of FIG. 2 in its overvoltage mode. The 'overvoltage' mode of operation is carried out by the power supply circuit 200 when the input voltage 202 is above the normal desired range, e.g. due to a transient spike on the input supply voltage. Thus if the input voltage 202 goes above 28 VDC to an upper threshold value, the overvoltage mode is used.

The plots shown in FIG. 6, from top to bottom, are: the first output voltage $V_{out1}$ (i.e. the voltage across the output 204); the second output voltage $V_{out2}$ (i.e. the voltage across the output 206); the voltage $V_{boost}$ at the output of the inductor 212; the voltage $V_{buck}$ at the input of the inductor 212; and the input supply voltage $V_{in}$.

As can be seen in FIG. 6, the input supply voltage $V_{in}$ 'spikes' during a brief time window 600, rising from its normal value of 28 VDC to 100 VDC. At this stage, the input voltage sense unit 218 determines that the input supply voltage $V_{in}$ has risen above an upper threshold value and enables the overvoltage mode, as explained in further detail with respect to FIGS. 10 and 11. During this time window 600, the output voltages—i.e. the first output voltage $V_{out1}$ and the second output voltage $V_{out2}$—both remain relatively constant, despite the spike in the input supply voltage $V_{in}$.

Thus it can be seen that the circuit 200 of FIG. 2 provides stable output voltages throughout normal, hold-up, and overvoltage operation. It will be understood that the continuous input current $I_{boost}$ drawn during normal operation and described above with regard to FIGS. 4A and 4B is discontinuous during hold-up and overvoltage operation. Normal operation is as outlined below.

Figure 7:
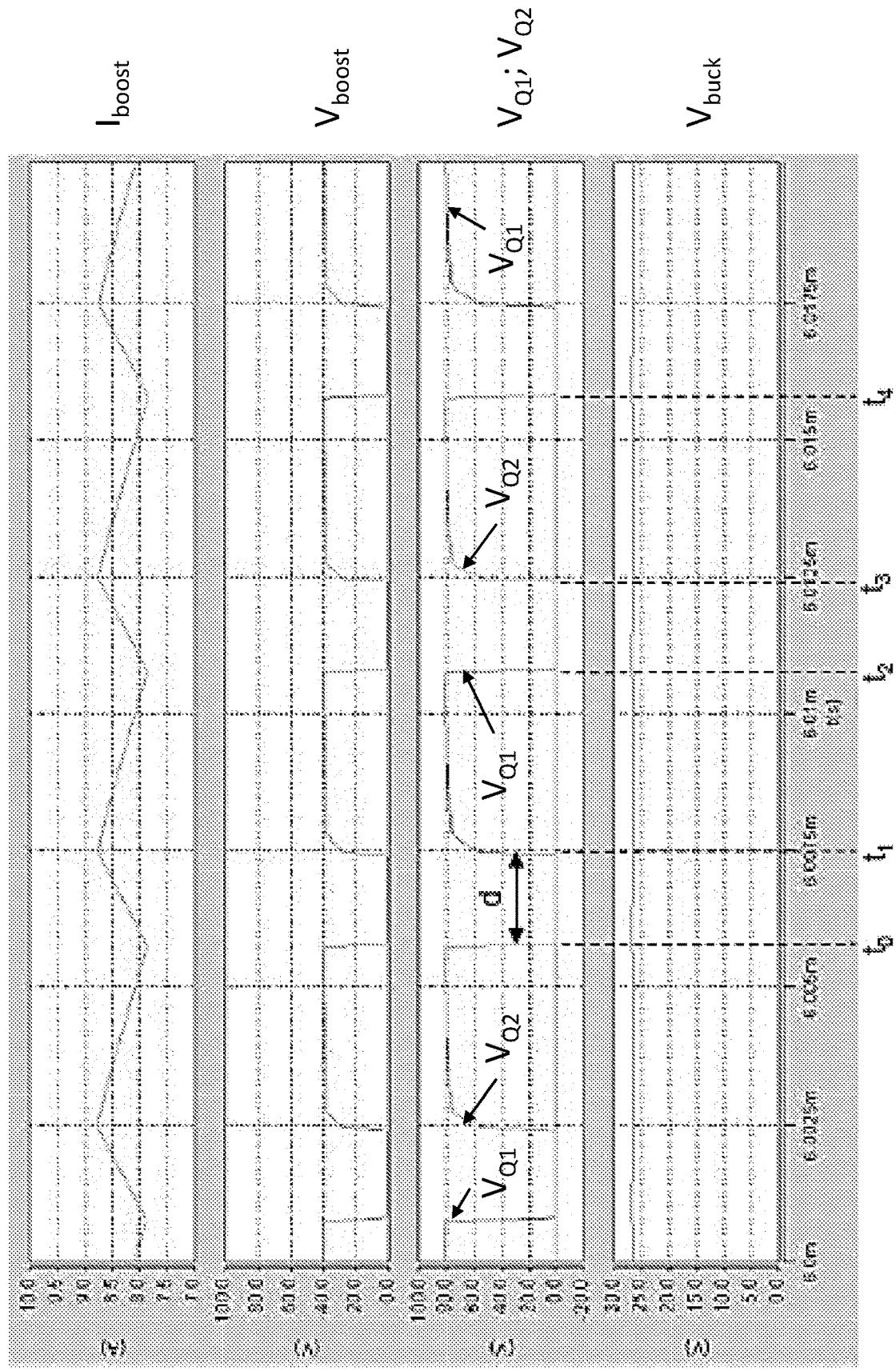
FIG. 7 is a graph showing operation of the circuit of FIG. 2 in its normal mode in further detail.

FIG. 7 is a graph showing operation of the circuit 200 of FIG. 2 in its normal mode in further detail. During the normal mode, the 28 VDC input voltage $V_{in}$ is monitored by the input voltage sense unit 218 and the switches Q3, Q4 of the two-switch portion 210 are controlled (using the control voltages $V_{Q3}$, $V_{Q4}$) such that Q3 is switched on (i.e. closed) and Q4 is switched off (i.e. opened). In this mode, the diode D5 between the third switch Q3 and the inductor 212 is forward biased and acts a reverse voltage blocking device.

Between $t_0$ and $t_1$, the output voltage $V_{out1}$ is sensed by the output voltage sense unit 224 and the PWM controller 222 modulates the switches Q1 and Q2 of the push-pull portion 214 using PWM techniques known in the art per se. The conduction overlap period, i.e. the time when both $V_{Q1}$ and $V_{Q2}$ are low simultaneously, provides the effective duty cycle, d.

At $t_0$, the 'on time' (d) commences because both $V_{Q1}$ and $V_{Q2}$ are low simultaneously, which causes the primary windings of the transformer 234 to be short circuited, allowing current in the inductor 212 to rise at a rate governed by $V_{in}$ divided by the inductance of the inductor 212.

Between $t_1$ and $t_2$, the first switch Q1 is turned off and energy stored in the inductor 212 is transferred to the output loads (not shown) connected to the output portions 236, 238 via the secondary windings of the transformer 234. The turns ratio of the transformer 234 determines the magnitude of Q1 switch voltage and $V_{boost}$ node during the 'off time' (1−d). During this time, the energy storage capacitor C1 is also trickle charged via D7 and the fixed resistor R1. The magnitude of the Q1 off voltage establishes a relatively high voltage from which to charge C1.

At $t_2$, the on time commences once more because both $V_{Q1}$ and $V_{Q2}$ are again low simultaneously. As before, this causes the primary windings of the transformer 234 to be short circuited and allows the current in the inductor 212 to rise.

Between $t_3$ and $t_4$, the second switch Q2 is turned off and energy stored in the inductor 212 is transferred to the output loads via the secondary windings of the transformer 234. The turns ratio of the transformer 234 determines the magnitude of Q2 switch voltage and $V_{boost}$ node during the off time. During this time, the energy storage capacitor C1 is also trickle charged via D8 and the fixed resistor R1. The magnitude of the Q2 off voltage establishes a relatively high voltage from which to charge C1.

At $t_4$, the on time commences once more and the cycle repeats, where Q1 and Q2 are never both off simultaneously. Importantly, input current drawn from the input voltage $V_{in}$ remains continuous throughout the steady-state input voltage range, thereby reducing the differential mode filter attenuation requirements and hence cost, size and weight compared to conventional approaches.

Throughout the normal operation, the value of $V_{buck}$ (i.e. the voltage at the input of the inductor 212) is substantially equal to the input voltage $V_{in}$ (i.e. 28 VDC), less the forward voltage drop across D5.

Figure 8:
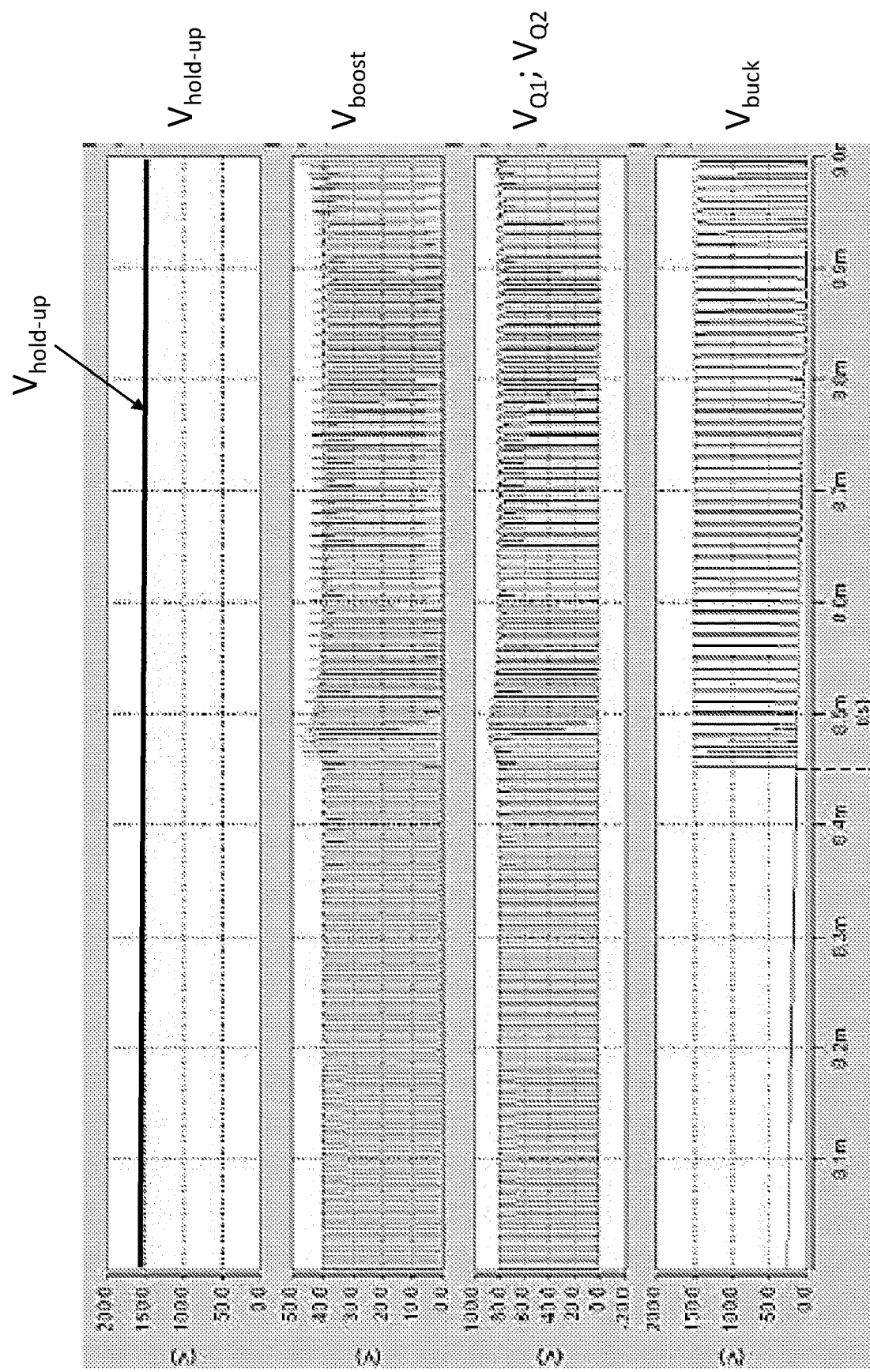
FIG. 8 is a graph showing how the hold-up mode of the circuit of FIG. 2 is triggered.
Figure 9:
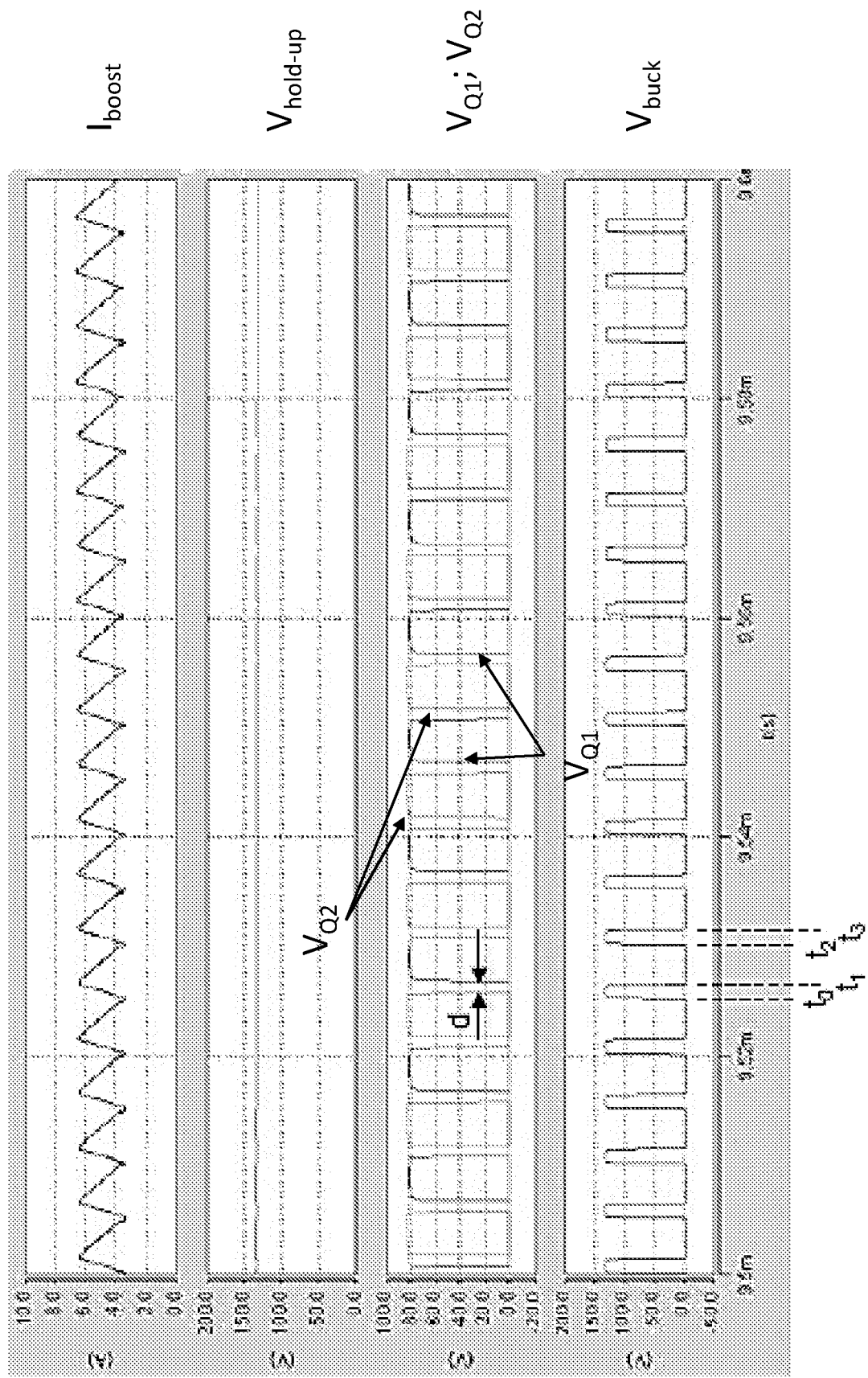
FIG. 9 is a graph showing operation of the circuit of FIG. 2 in its hold-up mode in further detail.

FIG. 8 is a graph showing how the hold-up mode of the circuit 200 of FIG. 2 is triggered, while FIG. 9 is a graph showing operation of the circuit 200 of FIG. 2 in its hold-up mode in further detail.

During the hold-up mode, the input voltage $V_{in}$ is monitored by the input voltage sense unit 218 and the switch drive unit 220 applies switch logic such that the third switch Q3 is on while the fourth switch Q4 is controlled via a PWM control signal, derived from the PWM controller 222. During the hold-up mode, the input diode D5 acts a reverse voltage blocking device and the PWM controller 222 modulates the switches Q1 and Q2 in the push-pull portion 214 in the same way as described above. Duty cycle information 230 is routed to the switch drive unit 220 by the PWM controller 222.

When the input voltage sense unit 218 (which monitors the 28 VDC input voltage $V_{in}$) determines that the input voltage $V_{in}$ has fallen below a lower threshold voltage, the hold-up mode is enabled. As such, the fourth switch Q4 is controlled via a PWM signal according to the duty cycle information 230 provided by PWM controller 222.

At $t_0$, the on time commences. Between $t_0$ and $t_1$, the fourth switch Q4 in the two-switch portion 210 and the switches Q1, Q2 in the push-pull portion 214 are turned on. This results in the primary windings of the transformer 234 being short circuited, which allows the current in the inductor 212 to rise, where this current is derived from the charge on the 'hold-up' capacitor C1. The rate of rise in current in the inductor 212 is governed by $V_{hold-up}$ divided by the inductance of the inductor 212. The conduction overlap period provides the effective duty cycle, d.

The off time commences at $t_1$, whereby switches Q4 & Q1 turn OFF. At this stage, the reverse bias diode D6 acts as a freewheel diode for the inductor 212, clamping $V_{buck}$ to 0 V. The magnitude of Q1 switch and $V_{boost}$ voltages are again determined by the turns ratio of the transformer 234. The energy stored in the inductor 212 is transferred to the outputs via the secondary windings of the transformer 234 during the off time.

At $t_2$ the on time commences once more, and between $t_2$ and $t_3$, the fourth switch Q4 in the two-switch portion 210 and the switches Q1, Q2 in the push-pull portion 214 are turned on. This results in the primary windings of the transformer 234 being short circuited, which allows the current in the inductor 212 to rise again, driven by the hold-up voltage $V_{hold-up}$ provided by the hold-up capacitor C1.

The off time commences again at $t_3$, at which time Q4 & Q2 turn off. Between $t_3$ and $t_4$, D6 once more acts as a freewheel diode for the inductor 212, clamping $V_{buck}$ to 0 V. The magnitude of the Q2 switch and $V_{boost}$ voltages are again determined by the turns ratio of the transformer 234. The energy stored in the inductor 212 is transferred to the outputs via the secondary windings of the transformer 234 during the off time.

Figure 10:
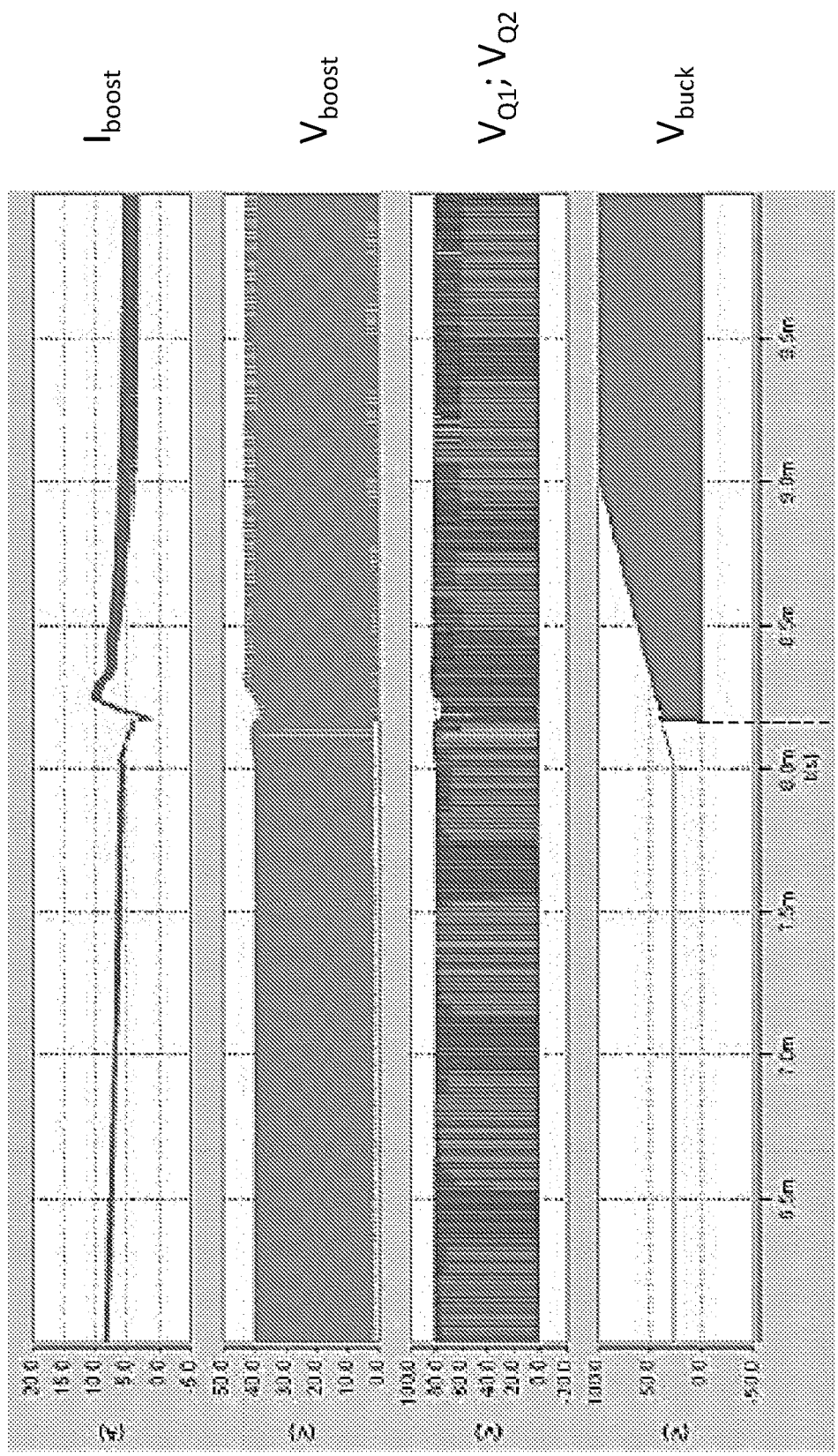
FIG. 10 is a graph showing how the overvoltage mode of the circuit of FIG. 2 is triggered.
Figure 11:
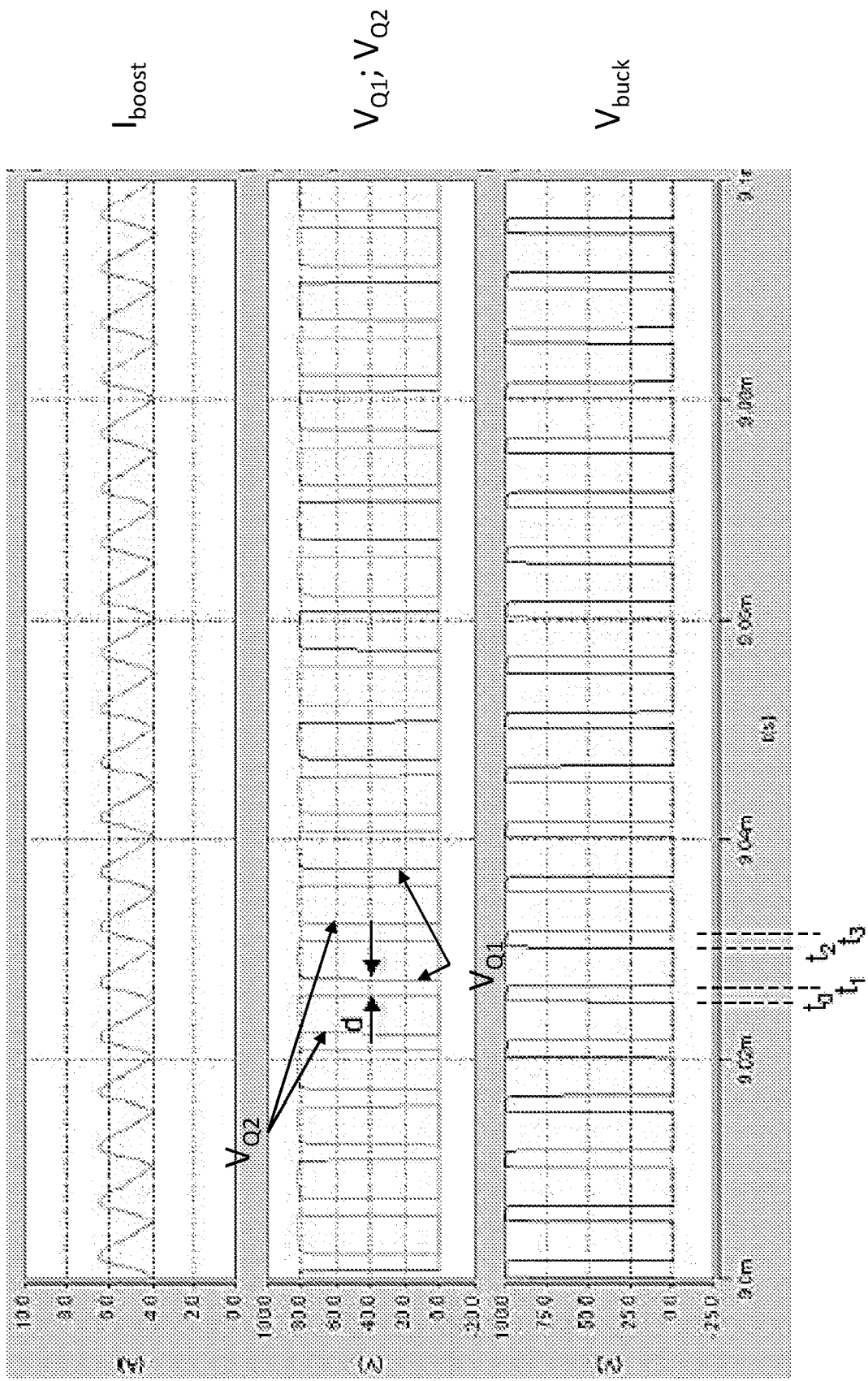
FIG. 11 is a graph showing operation of the circuit of FIG. 2 in its overvoltage mode in further detail.

FIG. 10 is a graph showing how the overvoltage mode of the circuit of FIG. 2 is triggered, while FIG. 11 is a graph showing operation of the circuit 200 of FIG. 2 in its overvoltage mode in further detail.

During the overvoltage mode, the 28 VDC input voltage $V_{in}$ is monitored by the input voltage sense unit 218 and the switch drive unit 220 applies switch logic such that the third switch Q3 is controlled via a PWM control signal while the fourth switch Q4 is turned off (i.e. opened). Also during the overvoltage mode, the PWM controller 222 modulates the switches Q1 and Q2 in the push-pull portion 214 in the same way as described above. Duty cycle information 230 is routed to the switch drive unit 220 by the PWM controller 222.

When the input voltage sense unit 218 determines that the input voltage $V_{in}$ has risen above an upper threshold voltage, the overvoltage mode is enabled. As such, the third switch Q3 is controlled via a PWM signal according to the duty cycle information 230 provided by PWM controller 222.

At $t_0$, the on time commences. Between $t_0$ and $t_1$, the third switch Q3 and the two switches Q1, Q2 of the push-pull portion 214 are turned on. The primary windings of the transformer 234 are short circuited, allowing the current $I_{boost}$ in the inductor 212 to rise. The rate of this rise is governed by the input voltage $V_{in}$ divided by the inductance of the inductor 212, and the conduction overlap period provides the effective duty cycle, d.

The off time commences at $t_1$. Between $t_1$ and $t_2$, Q3 & Q1 turn off and D6 acts as a freewheel diode for the inductor 212, clamping $V_{buck}$ to 0 V. The magnitude of the Q1 switch and $V_{boost}$ voltages are again determined by the turns ratio of the transformer 234. The energy stored in the inductor 212 is transferred to the output loads via the secondary windings of the transformer 234 during the off time.

At $t_2$, the on time commences once more. Between $t_2$ and $t_3$, Q3, Q1 & Q2 turn on. The primary windings of the transformer 234 are short circuited, allowing the current $I_{boost}$ in the inductor 212 to rise once more.

The off time commences again at $t_3$. Between $t_3$ and $t_4$, Q3 & Q2 turn off and D6 resumes its role as a freewheel diode for the inductor 212, clamping $V_{buck}$ to 0 V. The magnitude of the Q2 switch and $V_{boost}$ voltages are again determined by the turns ratio of the transformer 234. The energy stored in the inductor 212 is transferred to the output loads via the secondary windings of the transformer 234 during the off time.

Thus it will be appreciated by those skilled in the art that examples of the present disclosure provide an improved power supply circuit that may provide continuous input ripple current e.g. from a 28 VDC power source, thereby minimising total cost, weight and size of the converter compared to prior art arrangements. Examples of the present disclosure may advantageously tolerate a relatively wide input voltage range during transients. A power supply circuit in accordance with examples of the present disclosure may also provide multiple isolated 'tightly regulated' outputs using a single PWM controller. Such a circuit may also intrinsically provide high voltage hold-up storage, together with 'lightning insulation' for secondary-side (i.e. downstream) circuits.

While specific examples of the disclosure have been described in detail, it will be appreciated by those skilled in the art that the examples described in detail are not limiting on the scope of the disclosure.

What is claimed is:

1. A power supply circuit comprising:
    a push-pull portion comprising a transformer having a primary winding and a plurality of secondary windings that share the primary winding, wherein a first terminal of the primary winding is connected to ground via a first switch, and wherein a second terminal of the primary winding is connected to ground via a second switch;
    an inductor having a first terminal thereof connected to an input voltage via a third switch, wherein a second terminal of the inductor is connected to a centre tap on the primary winding of the transformer;

an energy storage portion connected between the primary winding of the transformer and ground, said energy storage portion being further connected to the first terminal of the inductor via a fourth switch such that the fourth switch can control the flow of current from the energy storage portion to the first terminal of the inductor, wherein the first, second, third and fourth switches have respective control terminals; and a plurality of output portions, each comprising first and second output terminals and arranged to provide a respective output voltage across said first and second output terminals, wherein a first terminal of each secondary winding is connected to the first output terminal of a corresponding output portion via a respective first forward bias output diode, a respective second terminal of each secondary winding is connected to the respective first output terminal via a respective second forward bias output diode, and wherein the respective second output terminal is connected to a centre tap of the respective secondary winding, a forward bias diode connected between the third switch and the first terminal of the inductor and arranged to prevent a back flow of current from the fourth switch to the input voltage.

2. The power supply circuit as claimed in claim 1, comprising a controller arranged to operate the first, second, third, and fourth switches.

3. The power supply circuit as claimed in claim 2, wherein said controller is arranged to apply a first pulse width modulated (PWM) signal to the first switch, and to apply a second PWM signal to the second switch, wherein said first and second PWM signals partially overlap.

4. The power supply circuit as claimed in claim 2, wherein said controller is arranged to apply a third PWM signal to the third switch, and to apply a fourth PWM signal to the fourth switch.

5. The power supply circuit as claimed in claim 2, comprising an output voltage sense unit arranged to determine a magnitude of at least one output voltage and to supply said determined magnitude to the controller, wherein the controller compares the determined magnitude to a reference value and operates at least one of the first, second, third, and fourth switches based on a difference between the determined magnitude and the reference value.

6. The power supply circuit as claimed in claim 5, wherein said controller is arranged to operate at least one of the first, second, third, and fourth switches to drive the output voltage toward the reference value.

7. The power supply circuit as claimed in claim 6, wherein said controller us arranged to modulate first and second PWM signals applied to the first and second PWM switches to drive the output voltage toward the reference value.

8. The power supply circuit as claimed in claim 1, comprising a reverse bias diode connected between the first terminal of the inductor and ground.

9. The power supply circuit as claimed in claim 1, comprising a capacitor having a first terminal thereof connected to the first and second terminals of the primary winding, said capacitor having a second terminal thereof connected to ground, wherein the first terminal of the capacitor is further connected to the first terminal of the inductor via the fourth switch.

10. The power supply circuit as claimed in claim 9, wherein the first terminal of the capacitor is connected to the first and second terminals of the primary winding via a resistor.

11. The power supply circuit as claimed in claim 4, wherein the controller is arranged to monitor the input voltage and is further arranged such that:

when the input voltage is between a first threshold and a second threshold greater than said first threshold, the controller operates the power supply circuit in a first mode in which the controller closes the third switch and opens the fourth switch;

when the input voltage is above the second threshold, the controller operates the power supply circuit in a second mode in which the controller applies the third PWM signal to the third switch and opens the fourth switch; and when the input voltage is below the first threshold, the controller operates the power supply circuit in a third mode in which the controller closes the third switch and applies the fourth PWM signal to the fourth switch.

* * * * *